United States Patent
Ross et al.

(10) Patent No.: US 8,718,621 B2
(45) Date of Patent: May 6, 2014

(54) NOTIFICATION METHOD AND SYSTEM

(75) Inventors: Steven J. Ross, Livonia, MI (US);
Jeffrey M. Stefan, Clawson, MI (US);
Jeffrey G. Ravas, Oxford, MI (US)

(73) Assignee: General Motors LLC, Detroit, MI (US)

( * ) Notice: Subject to any disclaimer, the term of this patent is extended or adjusted under 35 U.S.C. 154(b) by 791 days.

(21) Appl. No.: 12/711,865

(22) Filed: Feb. 24, 2010

(65) Prior Publication Data

US 2011/0207439 A1    Aug. 25, 2011

(51) Int. Cl.
*H04L 29/06* (2006.01)
*H04M 3/42* (2006.01)
*G06Q 30/00* (2012.01)
*G06F 17/00* (2006.01)

(52) U.S. Cl.
USPC ............. 455/414.3; 455/414.1; 455/415; 705/14.4; 705/14.73; 715/235

(58) Field of Classification Search
USPC ........ 455/414.1, 414.3, 415; 705/14.4, 14.73; 709/203, 219; 379/88.13; 715/235
See application file for complete search history.

(56) References Cited

U.S. PATENT DOCUMENTS

| | | | | |
|---|---|---|---|---|
| 7,894,639 | B2 * | 2/2011 | Grim et al. | 382/118 |
| 2007/0201634 | A1 * | 8/2007 | Bonnaud et al. | 379/88.13 |
| 2008/0126476 | A1 * | 5/2008 | Nicholas et al. | 709/203 |
| 2009/0119769 | A1 * | 5/2009 | Ross et al. | 726/13 |
| 2009/0276466 | A1 * | 11/2009 | Blohm et al. | 707/200 |
| 2010/0058417 | A1 * | 3/2010 | Rondeau et al. | 725/110 |
| 2011/0131633 | A1 * | 6/2011 | MacAskill et al. | 726/4 |
| 2012/0101994 | A1 * | 4/2012 | Baffier et al. | 707/640 |
| 2012/0259852 | A1 * | 10/2012 | Aasen et al. | 707/737 |

* cited by examiner

*Primary Examiner* — Inder Mehra
(74) *Attorney, Agent, or Firm* — Dierker & Associates, P.C.

(57) ABSTRACT

A notification method involves creating a template via a web server interface, where the template includes a statement having at least one tag, and triggering a transmission of raw data from a mobile communications device to the web server interface. The method further involves completing the template via the web server interface using the raw data transmitted to the mobile communications device. The template is completed by substituting the tag(s) with an alphanumeric expression deduced from the raw data. The method also involves uploading the completed template onto a remotely accessible social networking page.

21 Claims, 3 Drawing Sheets

NOTIFICATION METHOD AND SYSTEM

TECHNICAL FIELD

The present disclosure relates generally to notification methods and systems.

BACKGROUND

Social and/or professional networking websites such as, e.g., Twitter™, Facebook™, MySpace®, LinkedIn®, and the like have recently been adopted as a convenient and accessible means of online communication. Such social and/or professional networking websites enable a user to create his/her own personal webpage upon which the user can post questions, blogs, personal data, pictures, videos, music, and/or the like. Such information may then be viewed by "friends" who have access to the user's personal webpage.

SUMMARY

A notification method is disclosed herein. The method involves creating a template via a web server interface, where the template includes a statement having at least one tag. The method further involves triggering a transmission of raw data from a mobile communications device to the web server interface, and completing the template using the raw data transmitted from the mobile communications device. The template is completed by substituting the tag(s) with an alphanumeric expression deduced from the raw data. The method also involves uploading the completed template onto a remotely accessible social networking page.

A system for accomplishing the notification method is also disclosed herein.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
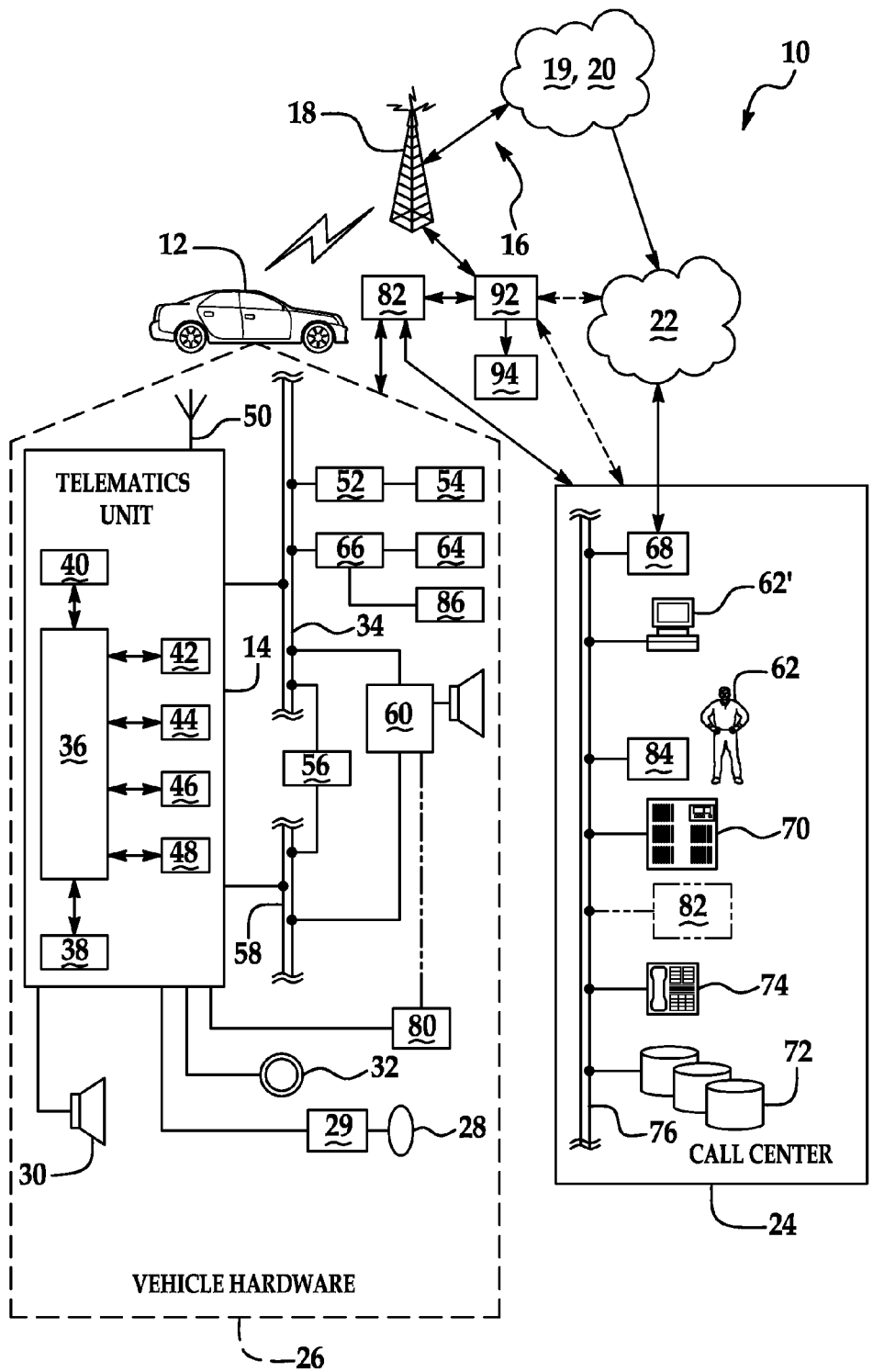
FIG. 1 is a schematic diagram depicting an example of a notification system.

Examples of the method and system disclosed herein may be used to notify members of an online social networking group of real time information that is automatically uploaded onto the user's personal webpage. Such uploading is advantageously accomplished without manual intervention by the user of the webpage. Instead, the uploading is automatically accomplished in response to a trigger. When the real time information has been uploaded, the information (in the form of, for example, a post, status update, etc.) is viewable by other members of the online networking group. The post may be used, for example, to notify the other members of an activity that the user is or will soon be engaged in. For instance, the upload may include a statement such as "Bill is leaving the office, and he is expected to arrive at the restaurant on Main and $2^{nd}$ in Detroit, Mich. by 5:30 pm". Such information, when automatically posted on the website at the time that Bill is leaving the office, would apprise the other members of the group that Bill should be at the restaurant at 5:30 pm that night.

The real time information uploaded on the user's personal webpage may also be advantageously used to initiate a blog stream with the other members of the online networking group. Such a blog stream may be used for making additional social plans between the other members of the networking group, where such plans may be based, at least in part, on the original post. Using the example provided above pertaining to Bill, upon viewing Bill's post, one or more of the members may then submit his/her comments in response to the post and/or add an activity related to the post. For example, one of the members may submit a comment to Bill's post, which states that "Jill is going to meet Bill at the restaurant at 5:30 pm." In response to Jill's comment, another member may submit a comment that states that "Phil is going to meet Bill and Jill at the restaurant, and is going to go to the club across the street from the restaurant afterwards for an 8:00 pm show". The other members of the group, upon viewing Bill's, Jill's, and Phil's posts, may decide to meet Bill, Jill, and Phil at the restaurant at 5:30 pm and/or join Phil at the club later that evening.

It is to be understood that, as used herein, the term "user" or "vehicle user" includes i) a vehicle owner, operator, and/or passenger, and/or ii) a person who participates in on-line social networking. It is further to be understood that the term "user" may be used interchangeably with the term subscriber/service subscriber. In the examples described hereinbelow, the user has a vehicle and also has his/her own personal webpage upon which the real time information is posted.

As also used herein, the term "member" refers to a person or entity who/that has been invited, by the user of a networking page, to access and view the networking page, and such person or entity has accepted the user's invitation. A member may also refer to a person or entity who/that has invited the user to be a part of a networking group, and the user has accepted such invitation. The networking page is generally associated with a host server. As used herein, a "host server" refers to a processor or computer upon which information of a website resides. In the examples disclosed herein, the website is a networking site, examples of which include a professional and/or social networking site. Non-limiting examples of social networking sites include Facebook™, Twitter™, LinkedIn®, and MySpace®. It is to be understood that the term "member" may be used interchangeably with the term "friend".

Furthermore, the term "upload," as used herein, may be used as a noun that refers to a message that is uploaded or posted onto the user's personal webpage according to examples of the method disclosed herein. It is to be understood that the term "upload" may be used interchangeably herein with the term "post", "status update", etc. It is to be further understood that, if the user's personal webpage is associated with Twitter™ as the social networking site, an upload may also be referred to as a "tweet".

Additionally, the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Also, the term "communication" is to be construed to include all forms of communication, including direct and indirect communication. As such, indirect communication may include communication between two components with additional component(s) located therebetween.

It is to be understood that the examples of the method disclosed herein may be performed in any system including a communications device. Such communications devices may be mobile or non-mobile. Some non-limiting examples of mobile communications devices include vehicle dedicated communication units, cellular phones, personal digital assistants, laptop computers, and/or the like. For purposes of illustration, the examples of the method will be described hereinbelow for use in conjunction with a vehicle dedicated communications unit, such as a telematics unit (identified by reference numeral 14 in FIG. 1), that is operatively disposed in a vehicle (identified by reference numeral 12 in FIG. 1). This system is considered to be an example of a notification system 10, and will be described in detail below at least in conjunction with FIG. 1.

Referring now to FIG. 1, the notification system 10 includes the vehicle 12, the telematics unit 14, a wireless carrier/communication system 16 (including, but not limited to, one or more cell towers 18, one or more base stations 19 and/or mobile switching centers (MSCs) 20, and one or more service providers (not shown)), one or more land networks 22, and one or more call centers 24. In an example, the wireless carrier/communication system 16 is a two-way radio frequency communication system.

In another example, the wireless carrier/communication system 16 includes one or more host servers 92 including suitable computer equipment (not shown) upon which information of a website resides/is stored. As disclosed herein, one of the websites may be a networking site with which a remotely accessible page 94 (e.g., a webpage) is associated. In an example, the remotely accessible page 94 is a networking page set up and maintained by the vehicle user and hosted by a social networking website. While, in this example, the webpage 94 is discussed as being a personal webpage of the user, it is to be understood that the webpage 94 may be run and owned by the entity operating the social networking website and is stored on the host server 92. It is further to be understood that the webpage 94 may be also be run and owned by the user who operates his/her own social networking site, where such site is stored on a user-owned host server.

The overall architecture, setup and operation, as well as many of the individual components of the notification system 10 shown in FIG. 1 are generally known in the art. Thus, the following paragraphs provide a brief overview of one example of such a notification system 10. It is to be understood, however, that additional components and/or other systems not shown here could employ the method(s) disclosed herein.

Vehicle 12 is a mobile vehicle such as a motorcycle, car, truck, recreational vehicle (RV), boat, plane, etc., and is equipped with suitable hardware and software that enables it to communicate (e.g., transmit and/or receive voice and data communications) over the wireless carrier/communication system 16. It is to be understood that the vehicle 12 may also include additional components suitable for use in the telematics unit 14.

Some of the vehicle hardware 26 is shown generally in FIG. 1, including the telematics unit 14 and other components that are operatively connected to the telematics unit 14. Examples of such other hardware 26 components include a microphone 28, a speaker 30 and buttons, knobs, switches, keyboards, and/or controls 32. In an example, the microphone 28 is part of a voice module 29 that is configured to receive voice commands from, for example, the vehicle user. Generally, these hardware 26 components enable a user to communicate with the telematics unit 14 and any other system 10 components in communication with the telematics unit 14.

Operatively coupled to the telematics unit 14 is a network connection or vehicle bus 34. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few. The vehicle bus 34 enables the vehicle 12 to send and receive signals from the telematics unit 14 to various units of equipment and systems both outside the vehicle 12 and within the vehicle 12 to perform various functions, such as unlocking a door, executing personal comfort settings, and/or the like.

The telematics unit 14 is an onboard device that provides a variety of services, both individually and through its communication with the call center 24. The telematics unit 14 generally includes an electronic processing device 36 operatively coupled to one or more types of electronic memory 38, a cellular chipset/component 40, a wireless modem 42, a navigation unit containing a location detection (e.g., global positioning system (GPS)) chipset/component 44, a real-time clock (RTC) 46, a short-range wireless communication network 48 (e.g., a BLUETOOTH® unit), and/or a dual antenna 50. In one example, the wireless modem 42 includes a computer program and/or set of software routines executing within processing device 36.

It is to be understood that the telematics unit 14 may be implemented without one or more of the above listed components, such as, for example, the short-range wireless communication network 48. It is to be further understood that telematics unit 14 may also include additional components and functionality as desired for a particular end use.

The electronic processing device 36 may be a micro controller, a controller, a microprocessor, a host processor, and/or a vehicle communications processor. In another example, electronic processing device 36 may be an application specific integrated circuit (ASIC). Alternatively, electronic processing device 36 may be a processor working in conjunction with a central processing unit (CPU) performing the function of a general-purpose processor.

The location detection chipset/component 44 may include a Global Position System (GPS) receiver, a radio triangulation system, a dead reckoning position system, and/or combinations thereof. In particular, a GPS receiver provides accurate time and latitude and longitude coordinates of the vehicle 12 responsive to a GPS broadcast signal received from a GPS satellite constellation (not shown).

The cellular chipset/component 40 may be an analog, digital, dual-mode, dual-band, multi-mode and/or multi-band cellular phone. The cellular chipset-component 40 uses one or more prescribed frequencies in the 800 MHz analog band or in the 800 MHz, 900 MHz, 1900 MHz and higher digital cellular bands. Any suitable protocol may be used, including digital transmission technologies such as TDMA (time division multiple access), CDMA (code division multiple access) and GSM (global system for mobile telecommunications). In some instances, the protocol may be short-range wireless communication technologies, such as BLUETOOTH®, dedicated short-range communications (DSRC), or Wi-Fi.

Also associated with electronic processing device 36 is the previously mentioned real time clock (RTC) 46, which provides accurate date and time information to the telematics unit 14 hardware and software components that may require and/or request such date and time information. In an example, the RTC 46 may provide date and time information periodically, such as, for example, every ten milliseconds.

The telematics unit 14 provides numerous services, some of which may not be listed herein, and is configured to fulfill one or more user or subscriber requests. Several examples of such services include, but are not limited to: turn-by-turn directions and other navigation-related services provided in conjunction with the GPS based chipset/component 44; airbag deployment notification and other emergency or roadside assistance-related services provided in connection with various crash and or collision sensor interface modules 52 and sensors 54 located throughout the vehicle 12; and infotainment-related services where music, Web pages, movies, television programs, video games and/or other content is downloaded by an infotainment center 56 operatively connected to the telematics unit 14 via vehicle bus 34 and audio bus 58. In one non-limiting example, downloaded content is stored (e.g., in memory 38) for current or later playback.

Again, the above-listed services are by no means an exhaustive list of all the capabilities of telematics unit 14, but are simply an illustration of some of the services that the telematics unit 14 is capable of offering.

Vehicle communications generally utilize radio transmissions to establish a voice channel with wireless carrier system 16 such that both voice and data transmissions may be sent and received over the voice channel. Vehicle communications are enabled via the cellular chipset/component 40 for voice communications and the wireless modem 42 for data transmission. In order to enable successful data transmission over the voice channel, wireless modem 42 applies some type of encoding or modulation to convert the digital data so that it can communicate through a vocoder or speech codec incorporated in the cellular chipset/component 40. It is to be understood that any suitable encoding or modulation technique that provides an acceptable data rate and bit error may be used with the examples disclosed herein. Generally, dual mode antenna 50 services the location detection chipset/component 44 and the cellular chipset/component 40.

The voice module 29, via the microphone 28, provides the user with a means for inputting verbal or other auditory commands, and can be equipped with an embedded voice processing unit utilizing human/machine interface (HMI) technology known in the art. Conversely, speaker 30 provides verbal output to the vehicle occupants and can be either a stand-alone speaker specifically dedicated for use with the telematics unit 14 or can be part of a vehicle audio component 60. In either event and as previously mentioned, microphone 28 and speaker 30 enable vehicle hardware 26 and call center 24 to communicate with the occupants through audible speech. The vehicle hardware 26 also includes one or more buttons, knobs, switches, keyboards, and/or controls 32 for enabling a vehicle occupant to activate or engage one or more of the vehicle hardware components. In one example, one of the buttons 32 may be an electronic pushbutton used to initiate voice communication with the call center 24 (whether it be a live advisor 62 or an automated call response system 62'). In this example, the voice communication may include a voice command submitted by the vehicle user. This voice command may be used to initiate an upload of real time information onto the user's personal webpage according to examples of the notification method described in further detail below. In another example, one of the buttons 32 may be used to initiate emergency services.

The vehicle 12 may also include in-vehicle gesture sensor(s) or camera(s) so that a user can input a command or respond to a request using motions or gestures (e.g., a thumbs-up sign to indicate a "yes" response).

The audio component 60 is operatively connected to the vehicle bus 34 and the audio bus 58. The audio component 60 receives analog information, rendering it as sound, via the audio bus 58. Digital information is received via the vehicle bus 34. The audio component 60 provides AM and FM radio, satellite radio, CD, DVD, multimedia and other like functionality independent of the infotainment center 56. Audio component 60 may contain a speaker system, or may utilize speaker 30 via arbitration on vehicle bus 34 and/or audio bus 58.

Still referring to FIG. 1, the vehicle crash and/or collision detection sensor interface 52 is/are operatively connected to the vehicle bus 34. The crash sensors 54 provide information to the telematics unit 14 via the crash and/or collision detection sensor interface 52 regarding the severity of a vehicle collision, such as the angle of impact and the amount of force sustained.

Other vehicle sensors 64, connected to various sensor interface modules 66 are operatively connected to the vehicle bus 34. Example vehicle sensors 64 include, but are not limited to, gyroscopes, accelerometers, magnetometers, emission detection and/or control sensors, environmental detection sensors, and/or the like. One or more of the sensors 64 enumerated above may be used to obtain the vehicle data for use by the telematics unit 14 or the call center 24 to determine the operation of the vehicle 12. Non-limiting example sensor interface modules 66 include powertrain control, climate control, body control, and/or the like.

In a non-limiting example, the vehicle hardware 26 includes a display 80, which may be operatively directly connected to or in communication with the telematics unit 14, or may be part of the audio component 60. Non-limiting examples of the display 80 include a VFD (Vacuum Fluorescent Display), an LED (Light Emitting Diode) display, a driver information center display, a radio display, an arbitrary text device, a heads-up display (HUD), an LCD (Liquid Crystal Diode) display, and/or the like.

Wireless carrier/communication system 16 may be a cellular telephone system or any other suitable wireless system that transmits signals between the vehicle hardware 26 and land network 22. According to an example, wireless carrier/communication system 16 includes one or more cell towers 18, base stations 19 and/or mobile switching centers (MSCs) 20, as well as any other networking components required to connect the wireless system 16 with land network 22. It is to be understood that various cell tower/base station/MSC arrangements are possible and could be used with wireless system 16. For example, a base station 19 and a cell tower 18 may be co-located at the same site or they could be remotely located, and a single base station 19 may be coupled to various cell towers 18 or various base stations 19 could be coupled with a single MSC 20. A speech codec or vocoder may also be incorporated in one or more of the base stations 19, but depending on the particular architecture of the wireless network 16, it could be incorporated within an MSC 20 or some other network components as well.

Land network 22 may be a conventional land-based telecommunications network that is connected to one or more landline telephones and connects wireless carrier/communication network 16 to call center 24. For example, land network 22 may include a public switched telephone network (PSTN) and/or an Internet protocol (IP) network. It is to be understood that one or more segments of the land network 22 may be implemented in the form of a standard wired network, a fiber or other optical network, a cable network, other wireless networks such as wireless local networks (WLANs) or networks providing broadband wireless access (BWA), or any combination thereof.

Call center 24 is designed to provide the vehicle hardware 26 with a number of different system back-end functions. According to the example shown here, the call center 24 generally includes one or more switches 68, servers 70, databases 72, live and/or automated advisors 62, 62', a processor 84, as well as a variety of other telecommunication and computer equipment 74 that is known to those skilled in the art. These various call center components are coupled to one another via a network connection or bus 76, such as one similar to the vehicle bus 34 previously described in connection with the vehicle hardware 26.

In an example, the call center 24 may host a web server interface 82 that is also coupled to the other call center components via the network connection 76. In another example, the web server interface 82 is a server intermediate between the call center 24 and the telematics unit 14. In either configuration, the web server interface 82 is in selective and operative communication with the telematics unit 14.

In an example, the web server interface 82 is configured (via appropriate computer programs and/or software, which are referred to herein as tools) to operate various functions of the social networking website. In an example, the web server interface 82 includes a tool for creating and maintaining personal webpages and a tool for managing ongoing activity with various webpages associated with the social networking website. The web server interface 82 also includes a tool for creating and completing templates that may be used to form a post based on the real time information. Details for creating and completing the template will be described below in conjunction with FIGS. 3A through 3C.

The processor 84, which is often used in conjunction with the computer equipment 74, is generally equipped with suitable software and/or programs configured to accomplish a variety of call center 24 functions. In an example, the processor 84 is configured to run at least some of the computer programs and/or software for performing various steps of the notification method that are performed at the call center 24. Such steps include, but are not limited to, translating raw data transmitted to the call center 24 into a form usable for completing a template using one of the tools at the web server interface 82 and/or retrieving additional data associated with the raw data from the database 72. Such method steps will also be described in further detail below.

The live advisor 62 may be physically present at the call center 24 or may be located remote from the call center 24 while communicating therethrough.

Switch 68, which may be a private branch exchange (PBX) switch, routes incoming signals so that voice transmissions are usually sent to either the live advisor 62 or the automated response system 62', and data transmissions are passed on to a modem or other piece of equipment (not shown) for demodulation and further signal processing. The modem preferably includes an encoder, as previously explained, and can be connected to various devices such as the server 70 and database 72.

The database(s) 72 may be designed to store subscriber profile records, subscriber behavioral patterns, or any other pertinent subscriber information. The database 72 may be designed to store data (i.e., additional data) that is associated with raw data. In some instances, for example, when generating an upload for the remotely accessible page 94, the additional data may be retrieved from a user profile stored in the database 72. The additional data may have been originally submitted from the user when his/her subscriber account was set up and/or may be stored in the database 72 over time as subscriber services are used according to a user's subscription agreement.

It is to be appreciated that the call center 24 may be any central or remote facility, manned or unmanned, mobile or fixed, to or from which it is desirable to exchange voice and data communications.

In some instances, the call center 24 is a data center that receives voice or data calls, analyzes the request associated with the voice or data call, and transfers the call to an application specific call center (not shown). It is to be understood that the application specific call center may include all of the components of the call center 24, but is a dedicated facility for addressing specific requests, needs, etc. Examples of such application specific call centers are emergency services call centers, navigation route call centers, in-vehicle function call centers, or the like. As such, in one embodiment, the user calls the main call center 24 with a request for directions, and his/her call may be directed to a navigation route call center that is equipped to fulfill the user's request.

Furthermore, a cellular service provider (not shown) generally owns and/or operates the wireless carrier/communication system 16. It is to be understood that, although the cellular service provider (not shown) may be located at the call center 24, the call center 24 is a separate and distinct entity from the cellular service provider. In an example, the cellular service provider is located remote from the call center 24. A cellular service provider provides the user with telephone and/or Internet services, while the call center 24 is a telematics service provider. The cellular service provider is generally a wireless carrier (such as, for example, Verizon Wireless®, AT&T®, Sprint®, etc.). It is to be understood that the cellular service provider may interact with the call center 24 to provide various service(s) to the user.

Examples of the notification method will now be described herein at least in conjunction with FIG. 2. As stated above, such examples will be described using the notification system 10 discussed in detail above. Again, it is to be understood that the examples of the method may be accomplished using other systems; not necessarily those that use telematics as a mobile communication means.

Figure 2:
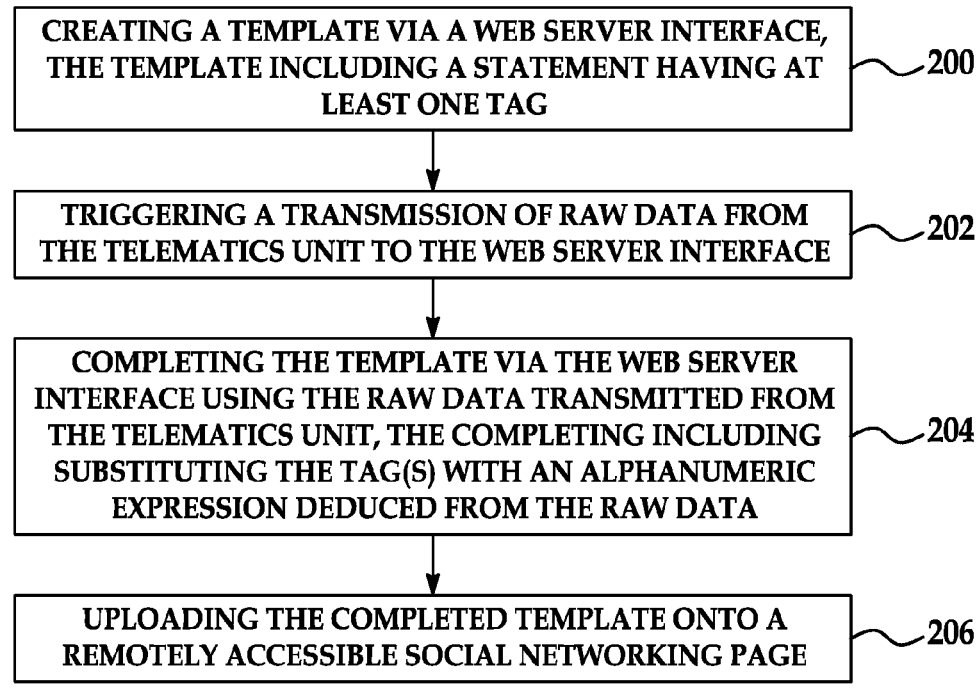
FIG. 2 is a flow diagram depicting an example of a notification method.

Referring now to FIG. 2, an example of the method includes creating a template via the web sever interface 82, where the template includes a statement having at least one tag (as shown by reference numeral 200). As used herein, the term "template" refers to a language-based model which may be utilized for generating a message that is ultimately uploaded or posted on the user's personal webpage 94. In an example, the template includes a statement (such as, e.g., a sentence or a phrase) having one word or a group of words that is/are tagged. Such tagged word(s) is/are referred to as a "tag". A non-limiting example of a template includes, "[I'm] on my [way]"; where the entire sentence is the statement, and the words shown in brackets (i.e., the words "I'm" and "way") are designated as tags. In one example, the tags are proper nouns and/or personal pronouns.

Figure 3A:
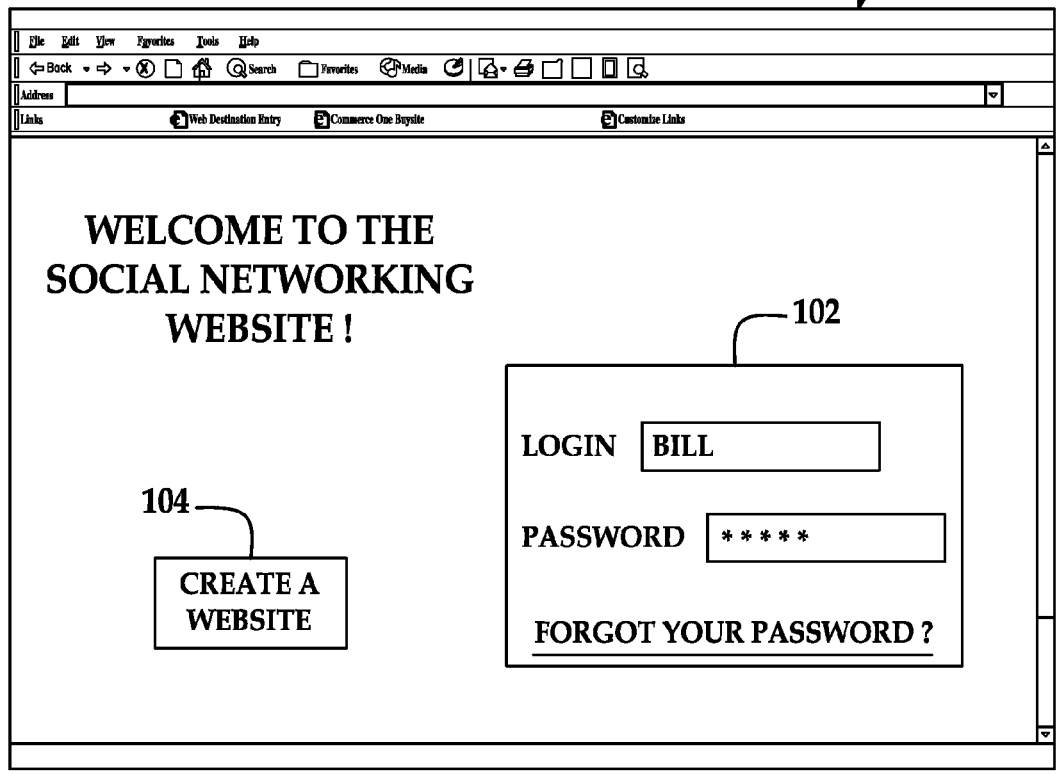
FIGS. 3A through 3C schematically depict examples of a user's personal webpage hosted by a social networking website.
Figure 3B:
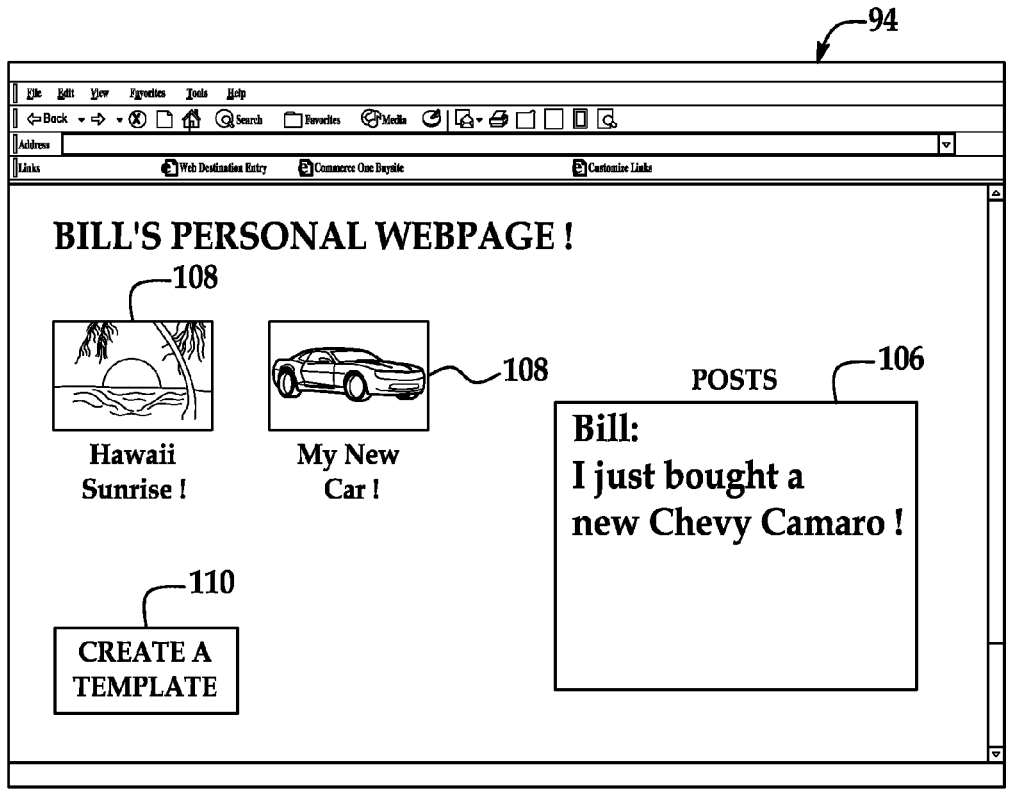
Figure 3C:
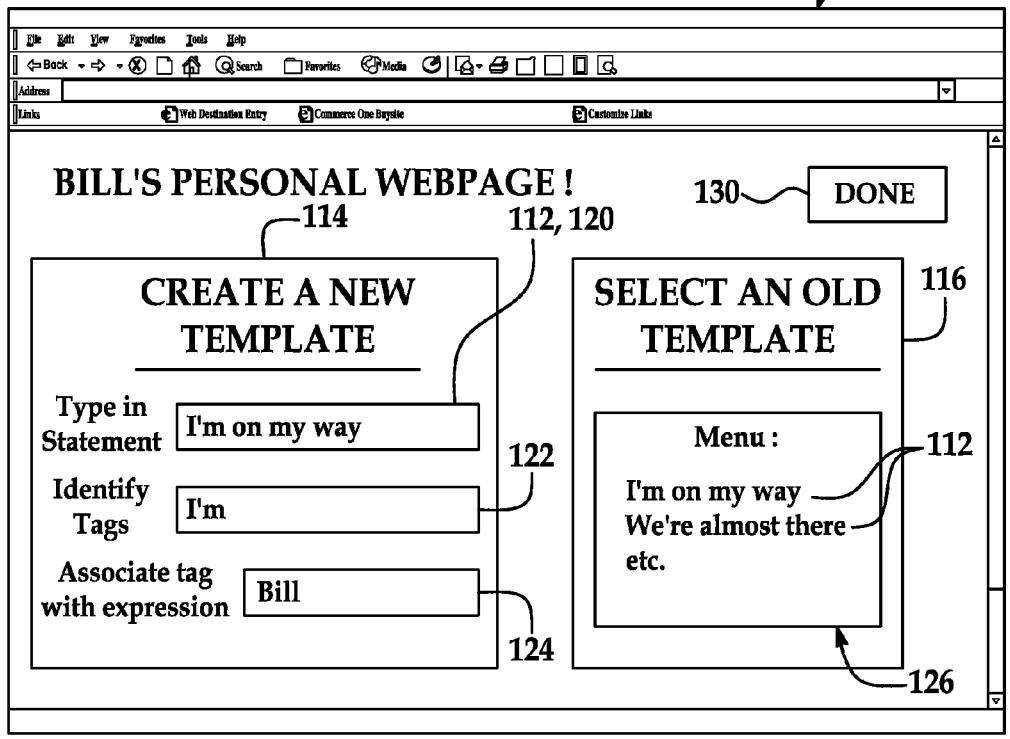

Referring now to FIGS. 3A through 3C, the template may be created, by the user, by accessing the user's personal webpage 94 through the web server interface 82 or by accessing a webpage associated with a telematics service provider (such a webpage is generally associated with a host server (e.g., host server 92), and may be a service site and/or account managing site associated with the call center 24). Either the webpage 94 or the telematics service provider webpage may be accessed via a remote connection with the web server interface 82 using, for example, the user's personal workstation (e.g., any electronic device capable of accessing the Internet, for example, a desktop computer, a laptop computer, a mobile device, or the like). Upon connecting with the web server interface 82, the user can connect with a homepage of the social networking website hosting the user's personal webpage 94 or with the website of the telematics service provider. A generic illustration of the social networking homepage is schematically depicted in FIG. 3A, and is identified by reference numeral 100.

Access to the personal webpage 94 or the user's account via the telematics service provider website may be accomplished by submitting an appropriate login and password into a login prompt 102 displayed on the homepage of the website (e.g., on the social networking homepage 100 shown in FIG. 3A). Upon entering the correct login and password, the user may be given access to his/her personal webpage 94 (an illustration of which is schematically shown in FIG. 3B), or his/her account information with the telematics service provider. However, in instances where the user has not yet signed up with the social networking site and created his/her personal webpage or has not created an online account with the telematics service provider, the user may do so by indicating as such on the homepage (e.g., homepage 100). Such may be accomplished, for example, by selecting a "Create a Webpage" icon 104 (or some other variation thereof, for example, "Create an Online Account", "New User? Click Here", or the like) displayed on the homepage 100. Upon selecting the icon 104, the user will have access to one of the tools operated by the web server interface 82, where such tool guides the user through steps for creating his/her personal webpage (such as the webpage 94) or an online account with the telematics service provider.

Once the user has accessed his/her personal webpage 94 or online telematics service provider account (or has created a new one), the user may perform any number of tasks associated with the use and/or maintenance of the webpage 94 or online account. As examples of maintenance of the webpage 94, the user may add or remove posts in a post box (identified by reference numeral 106 in FIG. 3B), pictures (which are identified by reference numeral 108 in FIG. 3B), music, videos, personal data/information, etc. The user may also create one or more templates through his/her personal webpage 94, where such template(s) may be used for automatically uploading real time information on the webpage 94. The creating of the template(s) may be accomplished, for example, by selecting the "Create a Template" icon 110 (or some other variation thereof) displayed on the webpage 94. The template(s) may also be created using the webpage/website associated with the telematics service provider. When the template(s) is/are created using the telematics service provider webpage, it is to be understood that the webpage 94 is linked to the user's telematics account/profile so that the template(s) is/are associated with the correct webpage 94. For example, the user my input his/her social networking information (e.g., site used, login, ID, etc.) so that the telematics service provider can use the generated template(s) with the appropriate personal webpage 94.

Referring now to FIG. 3C, the template (identified by reference numeral 112) may be generated by i) creating a new template (as shown in box 114), or ii) selecting an old template (as shown in box 116). A new template may be created, for example, by typing a statement into the statement box 120, and identifying one or more tags in the statement. The identifying of the tag(s) may be accomplished, for example, by typing the word recited in the statement in the tag box 122, selecting the word from a drop down menu of tags, highlighting the word/words in the statement and designating them as tags from a right click menu option, or the like. In the example shown in FIG. 3C, the statement "I'm on my way" is typed into the statement box 120, and the tag "I'm" is typed into the tag box 122. The tag "I'm" may then be associated with an alphanumeric expression or speech recognition grammar, which may be typed into the expression box 124 (e.g., the name "Bill" as shown in FIG. 3C) or which may be deduced from raw data transmitted to the web server interface 82 (e.g., the user's name may be taken from his/her webpage or telematics account profile). In another example, the user may have the option of using his/her name in place of any personal pronoun. As will be described in further detail below, when the template is completed and saved, the tag "I'm" may, for example, be replaced with the set alphanumeric expression, and the completed template (which now includes the expression incorporated into the statement in place of the identified tag) is posted on the user's personal webpage 94 in the post box 106. Details and/or examples of the alphanumeric expression, how it is obtained, and its use will be discussed further below.

Rather than creating a new template, the user may otherwise select an old or previously existing template from a drop-down menu provided on the webpage 94 (shown in box 126 in FIG. 3C) or the telematics service provider website. This drop-down menu may include a plurality of templates that have been previously used by the user and/or that are preset and available to the user for selection. In an example, the menu may contain all of the previously used and/or preset templates, arranged chronologically, alphabetically, or by the number of repeated use. In another example, the webpage 94 or the telematics service provider website may include a tool enabling the user to select "favorites", i.e., those templates that the user tends to use often and/or are considered to be favorites by the user, and such templates are included in the drop-down menu. The tool may also be used to delete unwanted templates from the drop-down menu.

Furthermore, when a new template is created, the new template may be automatically saved in an archive of templates. Such archive may be automatically included in the drop-down menu, and/or the user may select certain templates from the archive to include in the drop-down menu. Such an archive may be stored with the user's profile in the database(s) 72 or may be stored on the host server 72 of the social networking website, depending upon where the templates are created. In one example, the templates are created via the telematics service provider website and are stored in the database(s) 72.

In one example, the user creates the template knowing that he/she is most likely going to be engaged in an activity related to the template in the near future. Upon creating the template (either by inputting desirable information or by selecting one from the drop-down menu), the template is considered to be in an active state, and the template may be used, by the web server interface 82, to generate and upload a message on the user's webpage 94 in response to a trigger. In an example, once activated, the template remains active for a designated amount of time (e.g., from 4:00 pm to 6:00 pm on Feb. 14, 2010, etc.), after which time the template automatically becomes inactive. This particular example may be useful in instances where the user plans on engaging in an activity at a certain time on a certain date. In another example, the template may remain in the active state until the user designates otherwise (e.g., by manually deactivating the template using a command (not shown) provided on the webpage 94). In this example, the active template may be used at any time by the web server interface 82 to generate a post until the user manually designates (via the webpage 94 or the telematics service provider website) to inactivate the template. Also in this example, the active template will be used by the web server interface 82 after it recognizes a trigger indicating that the post is to be generated/uploaded.

In yet another example, a plurality of templates may be active at the same time and the web server interface 82 may select the most appropriate template based on the trigger received/recognized. For instance, the web server interface 82 may apply an active template that states that "[I'm] listening to [music]" upon receiving infotainment data, such as a then-currently playing radio station, from the telematics unit 14. It is to be understood that the user has control over which templates may or may not be active and/or how long the active templates will remain active. For instance, if the user does not want information pertaining to the music to which he/she is then-currently listening to be posted, the user can select to inactivate any of the templates associated with infotainment data. Thus, the designation of which templates to activate/inactivate allows the user, e.g., to prevent any unwanted messages from being posted on the webpage 94.

When the user is finished creating and/or selecting a template using one of boxes 114 or 116 shown in FIG. 3C, the user may select the "Done" (i.e., "Finished", "Complete", "Save", etc.) button 130 to indicate that he/she is finished. The user may then be taken back to the front or main page (shown in FIG. 3B) of his/her personal webpage 94 or to the main page of his/her account profile on the telematics service provider website.

Referring back to FIG. 2, the method further includes triggering a transmission of raw data from the telematics unit 14 to the web server interface 82. As used herein, the term "raw data" refers to any data transmitted from the telematics unit 14 (or other communications device) to the web server interface 82 (or to the call center 24 if it hosts the web server interface 82). Such raw data may include, for example, location-based data, route-based data, personal calling data, infotainment data, vehicle data, and combinations thereof.

The location-based data may be retrieved, e.g., from the location detection component 44 (such as a GPS unit), and is generally transmitted to the web server interface 82 in terms of longitudinal and latitudinal coordinates. The coordinates are received by the web server interface 82. The coordinates may be transmitted to the call center 24, which is configured to convert such coordinates into an address or intersection (also discussed further hereinbelow), if a corresponding address or intersection is available. If identified, the address or intersection is transmitted back to the web server interface 82, which checks to see if the user has generated an expression for the particular location. If an expression has been generated for the retrieved location-based data, the expression may be used for posts such as, e.g., "Bill just left work", "Steve arrived home safely", "Jeff's car is still at work," etc., when the received coordinates, address, or intersection is tagged with a previously identified location (e.g., home, work, etc.). When the coordinates, address, or intersection received have/has not been associated with a previously identified expression, it is to be understood that the coordinates themselves or the corresponding address or intersection may be included in the post. For example, if the identified address has not been tagged and associated with a particular location, such as "home", the web server interface 82 (in response to a trigger) will upload the post including the identified address. For example, a location data post may say "Bill just left 1234 Five Drive, Detroit, Mich." or "Steve arrived safely at N 42° 19.830 W 083° 02.419". Raw data location data posts may be particularly useful for users who utilize their vehicle 12 off-road.

In some instances, location-based data may be used to generate a location-based on-line chat between several vehicles going to or then-currently located in the same general location. For example, the location-based data of one vehicle 12 may be used to generate a post on the user's webpage 94 that apprises the user's on-line friends of where the user is parked at e.g., an amusement part, so that those friends going to the park can park near or find the user once arriving at the part. In this example, several vehicle users may be users of the social networking website, and thus the location data from each of the respective vehicles may be uploaded as posts (on their respective pages or in response to an initial post by one of the members) and used by others in the group in order to locate one another. In addition to being transmitted to the user's webpage 94, the uploaded posts may also be transmitted directly to friends' mobile devices depending upon the friends' account settings (e.g., the friends could follow each other, e.g., using a social site like Twitter™). In this particular example, the coordinate data may be transmitted to a computer program at the call center 24 to determine the exact (or close to the exact) positioning of the user's vehicle in the parking lot (e.g., Isle 3A, "East side of lot, close to entrance") and such location is posted on the webpage 94 (and, in some instances, transmitted to communication devices of the user's friends via a messaging service).

As previously mentioned, route-based data is another form of raw data that can be used to generate posts. The route-based data may include, e.g., general information that a navigation route is currently being used, or detailed information about a particular navigation route that the vehicle 12 is currently using. The route information may be i) obtained from the call center 24, ii) saved in and retrieved from the telematics unit 14, or iii) generated by an on-board navigation system. Such route-based data may be used for posts such as, e.g., "Mark is going to Sara's house via a route obtained from OnStar last night", "Stan is on his way to Memphis Smoke", "Jane is heading north on I-75", etc. In this particular example, the web server interface 82 may recognize that a destination has been tagged, and will analyze the route data to select the expression to replace the tag. Using the example "Jane is heading north on I-75", the template may say "I am heading direction on road", where "I am" is tagged to correspond with "Jane", and "direction" is tagged to correspond with a then-current direction being traveled, and "road" is tagged to correspond with the name of the road then-currently traveled on." In this example, the raw route data is analyzed to fill in the template tags.

Also as previously mentioned, personal calling data is yet another form of raw data that can be used to generate posts. The personal calling data may include information pertaining to the user's calling history from his/her cellular phone, in-vehicle phone, or the like. In one example, the calling device used is the device linked to the web server interface 82 so that the raw data may be transmitted from such calling device to the interface 82. In another example, the calling device is operatively connected to the vehicle 12 (e.g., via a short range wireless communication) so that the raw data may be transmitted from such calling device to the interface 82 through the vehicle 12. Such personal calling data may be used for posts such as, e.g., "Peter just got off the phone with Mandy", "Greg just made a call to Joe", etc. In this particular example, the web server interface 82 may recognize that a phone number has been tagged, and will analyze the calling history data to select the expression to replace the tag. Using the example "Greg just made a call to Joe", the template may say "I just made a call to phone number", where "I" is tagged to correspond with "Greg", and "phone number" is tagged to correspond with a phone number saved in the user's on-line address book. In this example, the raw calling data (i.e., the phone number) is used to query the address book to identify the person's name associated with the "phone number", where the identified name of the person replaces the tag. In this example, the user may set up the template to utilize the first name, the first and last names, or a nickname (if stored in the address book) of the identified name.

Infotainment data is still another form of raw data that can be used to generate posts. The infotainment data may be retrieved from the vehicle audio system 60, and such data may include radio stations and/or channels being then-currently listened to, and/or artists and/or track titles of music being then-currently played by the audio system 60 (such as from the radio, compact discs (CDs), audio tapes, mp3s, DVDs, etc.). The infotainment data may be used for posts such as, e.g., "Jeff is listening to XM radio channel 54 Chrome", "Ann is listening to a Frank Sinatra CD", etc. Using the example "Ann is listening to a Frank Sinatra CD", the template may say "I is listening to music", where "I" is tagged to correspond with "Ann," and "music" is tagged to correspond with whatever is then-currently being output in the vehicle 12. In this example, the raw infotainment data (i.e., the name of the CD) is input in place of the tag "music".

Vehicle data, as previously mentioned, may also be used to generate posts. Vehicle data may be obtained from the vehicle bus 34 (which receives the data from various vehicle sensors 54, 64 which collects such data). Examples of such data may include, for example, information pertaining to an average gas mileage, a current gas mileage, whether the vehicle 12 is in an idle state, if the windows and/or doors have been opened or closed, whether the convertible top is up or down, the battery capacity left (such as for electric vehicles), tire pressure, HVAC operations, etc. Such vehicle data may be used for posts such as, e.g., "Bob is cruising down Woodward with the top down", "Dana is getting 30 mpg in her Chevy® Camaro", etc. Using the example "Dana is getting 30 mpg in her Chevy® Camaro", the template may say "I is getting mpg in my car", where "I" is tagged to correspond with "Dana," and "mpg" is tagged to correspond with whatever the then-current mpg is, and car is tagged to correspond with the make and model of the user's vehicle. In this example, the raw vehicle data (i.e., the mpg) is input in place of the tag "mpg".

In an example, the triggering of the transmission of the raw data from the telematics unit 14 (or other device, such as, for example, a cellular phone) to the web server interface 82 may be accomplished, for example, in response to detecting and/or recognizing a triggering event. As used herein, a "triggering event" refers to a predefined happening that, upon being detected and/or recognized as having occurred, causes a tool at the web server interface 82 to trigger the transmission of the raw data from the telematics unit 14. The detecting and/or recognizing may be accomplished by the tool operated by the web server interface 82. Potential triggering events may be designated, by the user, using the web server interface 82. For example, the user may access his/her personal webpage 94 and associate the triggering event(s) with one or more active templates. Then, upon the interface 82 recognizing the occurrence of the designated triggering event(s), a transmission of the raw data may be initiated.

For instance, the user may designate a tag recited in a voice command as a triggering event. If, for example, the voice command is "I'm on my way," the triggering event may be the utterance of the tag "way". Upon recognizing the utterance of the designated tag, the web server interface 82 triggers a transmission of raw data from the telematics unit 14. Prior to such transmission, the web server interface 82 also designates the type of raw data that is to be transmitted from the telematics unit 14. Using the instant example, the tag "way" or other similar verbiage generally indicates that the user is traveling to some location, and the raw data requested would therefore be location-based data and/or route-based data (depending upon what type of data the user associated with the triggering tag). For example, when location data is associated with the triggering tag "way", the web server interface 82 designates, in addition to the triggering, that the raw data should be data retrieved from the GPS unit 44.

In another example, the triggering of the transmission of the raw data from the telematics unit 14 is accomplished periodically according to a predetermined time schedule. In this example, the user may designate, through the web server interface 82, that he/she would like a particular message posted on his/her webpage 94 on pre-selected days, at pre-selected times, and/or the like. For instance, the user may select to have the raw data transmitted every morning at 7:30 am. Further, via the web server interface 82, the user may identify the type of raw data to be transmitted in response to the triggering. For instance, the user may select to have raw data pertaining to what he/she is listening to on the radio every morning at 7:30 am. Such information would then be posted, in a desired format according to a selected template, as a message on the user's webpage 94. The triggering of the transmission of the raw data in a periodic fashion may be accomplished indefinitely or for a prescribed period of time (e.g., for the next three months), either of which is selectable by the user.

It is to be understood that, in many cases, the raw data transmitted from the telematics unit 14 to the web server interface 82 may not necessarily be in a format suitable for being uploaded as a post onto the user's webpage 94. For instance, in the example set forth above, the tag "way" triggers a transmission of GPS data from the telematics unit 14 to the web server interface 82. Such GPS data is typically transmitted in terms of longitudinal and latitudinal coordinates, which, in some cases, may not be helpful to friends viewing the webpage 94 to determine, e.g., where the user is headed. In such cases, the GPS data may be translated into a more useable format (e.g., an address, a pre-identified location (e.g., home, work, etc.)) prior to being incorporated in an upload. In instances where the web server interface 82 is separate from the call center 24, upon receiving the raw data at the web server interface 82, the method includes querying the call center 24 to obtain a translation of the raw data. Translating the raw data may be accomplished using one or more computer programs operated by the processor 84 at the call center 24. Using the example above, the processor 84 translates (e.g., via reverse geocoding) the GPS coordinate data into an address (e.g., 12345 Jefferson Ave.), a point of interest (e.g., Jacoby's), or the like. The translation may be transmitted from the call center 24 to the web server interface 82 so that the web server interface 82 can apply the translation to the upload, or to further associate the translation with a predefined expression to replace the tag. In one example, the translation is used as the alphanumeric expression that replaces the tag in the template, and in another example, the translation is used to identify another alphanumeric expression (associated with the translation) that replaces the tag in the template. While the translation described herein is related to location-based information, it is to be understood that any other data that may need to be translated (e.g., associating phone numbers with an address book entry) may be transmitted to the call center 24 for such translation.

In some cases, the call center 24 may otherwise be queried by the web server interface 82 to obtain additional data associated with the raw data. For instance, if the raw data includes the name of a song and the artist performing the song that the user is listening to, the call center 24 may be queried for additional data associated with the received infotainment data. Such additional data (which is stored in the user's profile at the call center 24) may include, for example, other artists in the same music category of the artist that the user is currently listening too. Such additional information may be included in the upload by the web server interface 82. As one non-limiting example, the upload may reveal something similar to "Bill is listening to "Hey Jealousy" by the Gin Blossoms. Bill also enjoys the song "Follow you Down," also by the Gin Blossoms." In an example, the additional data is used as the alphanumeric expression that replaces the tag in the template. In another example, an alphanumeric expression (generated from the raw data) is used to replace the tag in the template, and the additional data is used in addition to the alphanumeric expression. It is to be understood that the user may select or deselect an option to include additional information with one or more types of posts. When deselected, the call center 24 will not be queried for additional information. The user may select or deselect the additional information option for all posts, or may select the option for some posts while deselecting the option for other posts.

It is to be understood that, in some cases, the call center 24 may be queried to obtain both a translation of raw data and additional data pertaining to the raw data.

It is further to be understood that the raw data is transmitted from the telematics unit 14 directly to the call center 24 when the call center 24 hosts the web server interface 82. In this situation, the call center 24 need not be queried to obtain a translation of the raw data and/or to obtain additional data associated with the raw data. Rather, the translation and/or the obtaining of the additional data are/is accomplished by the web server interface 82 at the call center 24 by accessing the processor 84 and/or the database 72.

In an example, any of the raw data received by the web server interface 82 may be collected and cached at the call center 24, at the web server interface 82 (in cases where the web server interface 82 is separate from the call center 24), or at the telematics unit 14 prior to sending the raw data to the web server interface 82. The collected and cached data may be used, for example, to make a log of the user's activity during a prescribed amount of time. Such log may be used, for example, as additional data in a post on the user's webpage 94. For instance, the cached raw data may be used to generate a log of the type of music that the user listened to over the past half hour while inside the vehicle 12, and such log may be included in a post, such as "Bob has been listening to Pearl Jam for the past half hour".

Referring back to FIG. 2, the raw data transmitted to the web server interface 82 from the telematics unit 14 may be used, by the web server interface 82, to complete the template (as shown by reference numeral 204). More specifically, the completing of the template may be accomplished, for example, by substituting an alphanumeric expression for at least one tag present in the template, where the alphanumeric expression is deduced from the raw data (some non-limiting examples of which are provided throughout the previous discussion). The alphanumeric expression may be a descriptive word or phrase that, when substituted for the tag(s), renders the statement more comprehensible by the members of the networking group who may view the user's webpage 94. For example, if the template is "Chris will be home at [time]" and the raw data includes a time retrieved from the real time clock 46, a then-current velocity in mph, and the route being used to travel to the user's home, all of the raw data may be used (e.g., by the call center 24 when making a translation thereof) to deduce that the user will be home at 6:00 pm. The web server interface 82 may then substitute the alphanumeric expression of "6:00 pm" for the tag "time".

The alphanumeric expression may otherwise be pre-selected by the user when setting up the template. For instance, the user may designate the alphanumeric expression "Bill" intending to replace any tag having the word "I" in it. For example, the template "[I'm] going home" would be posted, as a complete template having the alphanumeric expression substituted for the tag, as "Bill is going home".

Other alphanumeric expressions are identified from the raw data in conjunction with other tools, for example, the user's on-line address book, a list of expressions associated with GPS coordinates, addresses or intersections, or the like.

Once the template is complete, it may be uploaded onto the user's personal webpage 94 (as shown by reference numeral 206 in FIG. 2). The uploading may be accomplished automatically, for example, by the web server interface 82.

While several examples have been described in detail, it will be apparent to those skilled in the art that the disclosed examples may be modified. Therefore, the foregoing description is to be considered exemplary rather than limiting.

The invention claimed is:

1. A notification method, comprising:
    creating a language-based template via a web server interface, the template including a statement having at least one tag;
    associating, via the web server interface, the template with at least one triggering event;
    triggering a transmission of real time raw data from a mobile communications device to the web server interface, wherein the mobile communications device is a telematics unit;
    completing the template via the web server interface using the real time raw data transmitted from the telematics unit, the completing including substituting the at least one tag with an alphanumeric expression deduced from the raw data; and
    uploading the completed template onto a remotely accessible social networking page;
    wherein the raw data is selected from any two or more from group consisting of location-based data, route-based data, personal calling data, infotainment data, and vehicle data.

2. The method as defined in claim 1 wherein the at least one triggering event includes a recognition of the at least one tag recited in a voice command submitted to the telematics unit, and wherein the triggering of the transmission is accomplished in response to recognizing the at least one tag as the at least one triggering event.

3. The method as defined in claim 1 wherein the triggering of the transmission of the raw data is accomplished periodically according to a predetermined time schedule.

4. The method as defined in claim 3 wherein the predetermined time schedule is selected using the web server interface, and wherein the method further comprises, via the web server interface, identifying the type of raw data to be transmitted to the web server interface in response to the triggering.

5. The method as defined in claim 1 wherein prior to completing the template, the method further comprises:

querying a call center to obtain, at the web server interface, a translation of the raw data or additional data associated with the raw data; and transmitting the translation or the additional data to the web server interface.

6. The method as defined in claim 5, further comprising:
collecting the raw data at the call center over a period of time; and then
caching the raw data at the call center.

7. The method as defined in claim 5 wherein the alphanumeric expression comprises the translation or the additional data.

8. The method as defined in claim 1 wherein the web server interface is hosted by a call center, and wherein prior to completing the template, the method further comprises translating the raw data or obtaining additional data from the raw data at the web server interface, thereby rendering the alphanumeric expression.

9. The method as defined in claim 1, further comprising:
collecting the raw data at the web server interface or at the telematics unit over a period of time; and then
caching the raw data at the web server interface or at the telematics unit.

10. The method as defined in claim 1, further comprising:
retrieving the location-based data from a location detection component, the location-based data being longitudinal and latitudinal coordinates;
transmitting the coordinates to a call center, whereat the coordinates are converted into an address, an intersection, or are left as coordinates;
transmitting the address, the intersection or the coordinates to the web server interface;
wherein the completed template includes the address, the intersection, or the coordinates.

11. The method as defined in claim 1, further comprising:
retrieving the route-based data from i) a call center, ii) a telematics unit, or iii) an on-board navigation system;
wherein the completed template includes a route deduced from the route-based data.

12. The method as defined in claim 1 wherein the personal calling data includes information pertaining to a user's calling history from a cellular phone or an in-vehicle phone.

13. A notification system, comprising:
a mobile communications device having a voice module operatively connected thereto, the voice module configured to receive a voice command submitted to the mobile communications device, wherein the mobile communications device is a telematics unit;
a web server interface in selective operative communication with the telematics unit, the web server interface including a tool enabling i) a creation of a language-based template, the template including a statement having at least one tag, ii) associating the template with a triggering event, and iii) completing the template using real time raw data transmitted thereto from the telematics unit in response to the triggering event, the completed template including an alphanumeric expression, deduced from the real time raw data, the alphanumeric expression being substituted for the at least one tag; and a remotely accessible social networking page including means enabling an upload of the completed template onto the remotely accessible social networking page;
wherein the raw data is any two or more from group consisting of selected from location-based data, route-based data, personal calling data, infotainment data, and vehicle data.

14. The system as defined in claim 13 wherein the triggering event includes a recognition of the at least one tag recited in the voice command submitted to the telematics unit.

15. The system as defined in claim 13 wherein the triggering event occurs periodically according to a predetermined time schedule.

16. The system as defined in claim 13, further comprising a call center in selective and operative communication with the web server interface, the call center including:
a processor configured to run computer readable code for translating the raw data;
a database having stored therein additional data associated with the raw data; and
means for transmitting the translation or the additional data to the web server interface.

17. The system as defined in claim 16 wherein the database at the call center is configured to collect the raw data over a period of time, and wherein the computer equipment further includes computer readable code for caching the raw data.

18. The system as defined in claim 13 wherein the location-based data comprises an address, an intersection, or longitudinal and latitudinal coordinates, and wherein the completed template includes the address, the intersection, or the coordinates.

19. The system as defined in claim 13 wherein the route-based data is retrieved from i) a call center, ii) a telematics unit, or iii) an on-board navigation system;
and wherein the completed template includes a route deduced from the route-based data.

20. The system as defined in claim 13 wherein the personal calling data includes information pertaining to a user's calling history from a cellular phone or an in-vehicle phone.

21. A notification method, comprising:
creating a language-based template via a web server interface, the template including a statement having at least one tag;
associating, via the web server interface, the template with at least one triggering event;
triggering a transmission of real time raw data from a mobile communications device to the web server interface, wherein the mobile communications device is a telematics unit;
completing the template via the web server interface using the real time raw data transmitted from the telematics unit, the completing including substituting the at least one tag with an alphanumeric expression deduced from the raw data; and
uploading the completed template onto a remotely accessible social networking page;
wherein the raw data is selected from the group consisting of location-based data, route-based data, and vehicle data.

* * * * *